(12) United States Patent
Reh et al.

(10) Patent No.: US 10,645,958 B2
(45) Date of Patent: May 12, 2020

(54) PLANT SEED BASED COMPOSITIONS AND USES THEREOF

(71) Applicant: NESTEC S.A., Vevey (CH)

(72) Inventors: Christoph Reh, Epalinges (CH); Stefan Palzer, Lausanne (CH); Lennart Fries, Lausanne (CH); Martin Leser, Bretigny-sur-Morrens (CH); Gerhard Niederreiter, Savigny (CH); Cecile Gehin-Delval, Les Hopitaux Neufs (FR)

(73) Assignee: Societe des Produits Nestle S.A., Vevey (CH)

( * ) Notice: Subject to any disclaimer, the term of this patent is extended or adjusted under 35 U.S.C. 154(b) by 23 days.

(21) Appl. No.: 15/538,548

(22) PCT Filed: Dec. 17, 2015

(86) PCT No.: PCT/EP2015/080282
§ 371 (c)(1),
(2) Date: Jun. 21, 2017

(87) PCT Pub. No.: WO2016/102313
PCT Pub. Date: Jun. 30, 2016

(65) Prior Publication Data
US 2018/0007935 A1  Jan. 11, 2018

(30) Foreign Application Priority Data
Dec. 22, 2014  (EP) .................................... 14199865

(51) Int. Cl.
*A23L 2/66* (2006.01)
*A23C 11/02* (2006.01)
*A23C 11/08* (2006.01)
*A23F 5/46* (2006.01)
*A23L 33/185* (2016.01)
*A23L 33/19* (2016.01)
*A23L 25/00* (2016.01)
(Continued)

(52) U.S. Cl.
CPC ................ *A23L 2/66* (2013.01); *A23C 11/02* (2013.01); *A23C 11/08* (2013.01); *A23F 5/465* (2013.01); *A23L 2/56* (2013.01); *A23L 25/30* (2016.08); *A23L 27/10* (2016.08); *A23L 27/80* (2016.08); *A23L 33/185* (2016.08); *A23L 33/19* (2016.08); *A23V 2002/00* (2013.01)

(58) Field of Classification Search
CPC . A23L 2/66; A23L 25/30; A23L 27/80; A23L 25/10
USPC ......................................... 426/607, 590, 634
See application file for complete search history.

(56) References Cited

U.S. PATENT DOCUMENTS 4,639,374 A * 1/1987 Matsunobu et al.
6,153,247 A * 11/2000 Stoddard
2013/0129879 A1* 5/2013 White et al.

FOREIGN PATENT DOCUMENTS

EP    2294927      3/2011
JP    200816723    * 7/2008
(Continued)

*Primary Examiner* — Helen F Heggestad
(74) *Attorney, Agent, or Firm* — K&L Gates LLP

(57) ABSTRACT

The present invention relates to processes for providing plant seed based compositions with enhanced mouthfeel and aroma. In addition the invention relates to the use of such plant seed based compositions for making capsules for beverage dispensers.

15 Claims, 20 Drawing Sheets

(51) Int. Cl.
    *A23L 27/10*     (2016.01)
    *A23L 2/56*     (2006.01)
    *A23L 27/00*     (2016.01)

(56) References Cited

FOREIGN PATENT DOCUMENTS

| | | |
|---|---|---|
| JP | 2008167723 | 7/2008 |
| WO | 2012051140 | 4/2012 |
| WO | 2013078510 | 6/2013 |
| WO | 2015000885 | 1/2015 |

\* cited by examiner

C.

E.

A.

B.

C.

C.

E.

A.

B.

PLANT SEED BASED COMPOSITIONS AND USES THEREOF

CROSS REFERENCE TO RELATED APPLICATIONS

The present application is a National Stage of International Application No. PCT/EP2015/080282, filed on Dec. 17, 2015, which claims priority to European Patent Application No. 14199865.8, filed on Dec. 22, 2014, the entire contents of which are being incorporated herein by reference.

TECHNICAL FIELD OF THE INVENTION

The present invention relates to processes for providing plant seed based compositions. In particular the present invention relates to beverages containing micronized plant seed particles. The present invention relates to the use of a plant seed in creamers, beverage powders, ready-to-drink liquid beverage preparations, or beverage capsules suitable for the production of a beverage.

BACKGROUND OF THE INVENTION

Dairy or non-dairy creamers or RTD beverages containing milk proteins are commonly used as whitener for coffee mixes. Milks based on almond, soy or peanut proteins are sold separately, but not as part of a coffee mix beverage or RTD beverage. Insoluble plant parts are often discarded or sold as dry flower. This means adding specific flavor sensation, such as almond or peanut flavors to the beverage is obtained by addition of artificial or natural flavor extracts.

In today's manufacturing processes of such flavoured drinks uses refined and/or processed oils that provide physical lipid sensations but lack typical flavour release from natural sources. Dairy taste is not preferred by consumers in South East Asia. Due to low solubility of plant material such as seeds, kernels, grains or nuts, e.g. almond, coconut or peanut, in water, the content of these in the final creamer or RTD preparation is limited to 2-3%. Also, oily plant materials are very difficult to grind or jet mill below 100 microns due to their sticky and plastic material behavior. Their oil content is between 10 and 70%. This means that a significant amount of 'oil binding' ingredients, such as maltrodextrin has to be added during the grinding step. Moreover, as such, they cannot be added to beverage preparations due to grittiness and texture issues. In the beverage, sedimentation of insoluble plant particles is observed, which can lead to the formation of a settled residue at the bottom of the cup, which is perceived as flaw by the consumer.

Flavor based compositions are also added to capsules for the preparation of a beverage in specifically designed brewing machines already exist on the market. Patent EP 0512468 relates to such a cartridge. Such capsules may be used for preparing beverages using beverage dispensers such as Nescafe Dolce Gusto® machine.

There is a need to produce capsules containing such beverage powder that has a long shelf life and better solubility.

WO2013078510 relates to milk analogues produced from nuts. CN103651909 relates to soybean milk capable of removing moisture and dispelling swelling and preparation method thereof. EP1313451 relates to compositions of milled particles, wherein wet milling is described in presence of liquid carrier medium including water, alcohols and in passing mentions vegetable oils.

None of the prior art provide a solution to increase the stability of the compositions in particular reduce sedimentation and enhance other desired properties such as aroma release. The desired stabilization effect achieved by the present invention is demonstrated in FIG. 1 wherein the micronized particle and the oil droplet interact in a manner which is termed as "balloon effect" which shows a consistent uniform product, achieved by encapsulating the plant seed particles in oil and introducing this to the creamer component as described below. The rounded particles represent the oil droplets in the emulsion. If the emulsion is not stable, the droplets merge together.

SUMMARY OF THE INVENTION

One aspect of the present invention relates to a process for providing plant seed based compositions with improved processability that leads to a more stable beverage product with enhanced aroma profiles.

In particular, it is an object of the present invention to provide plant seed based compositions that solve the above mentioned problems of the prior art with aroma release, sedimentation and solubility.

Thus, one aspect of the invention relates to a process for providing a plant seed based composition, the process comprising a first mixing step to obtain a first composition and a second mixing step to obtain a second composition; wherein
 a) mixing in a first mixing step an oil component with plant seed and grinding the plant seed in oil thereby providing a first composition comprising micronized plant seeds incorporated in the oil component wherein the oil comprises palm kernel oil, canola oil, soy bean oil, sunflower oil, safflower oil, cotton seed oil, palm oil, milk fat, corn oil, high oleic variants of oils such as high oleic soybean, high oleic canola, high oleic safflower, high oleic sunflower oil, and/or coconut oil;
 b) providing an aqueous component comprising milk proteins, plant proteins or combinations thereof thereby providing a second composition,
 c) mixing in a second mixing step the first composition with the second composition and
 d) homogenising the composition thereby providing an oil-in-water emulsion.

Another aspect of the present invention relates to an oil-in-water emulsified plant seed composition obtainable by the above mentioned process.

Further aspects of the present invention relates to uses of the plant seed compositions of the invention to produce beverage products, creamers and culinary products.

The present invention will now be described in more detail in the following.

BRIEF DESCRIPTION OF FIGURES

FIG. 7A: plate with sediments after 5 minutes time for the beverage containing hazelnut particles micronized in oil (FIG. 7A) and reference beverage made with dry milled hazelnut particles (FIG. 7B). Mass of sediments versus time for both the reference beverage and the beverage containing hazelnuts micronized in oil (FIG. 7C).

DETAILED DESCRIPTION OF THE INVENTION

Figure 1:
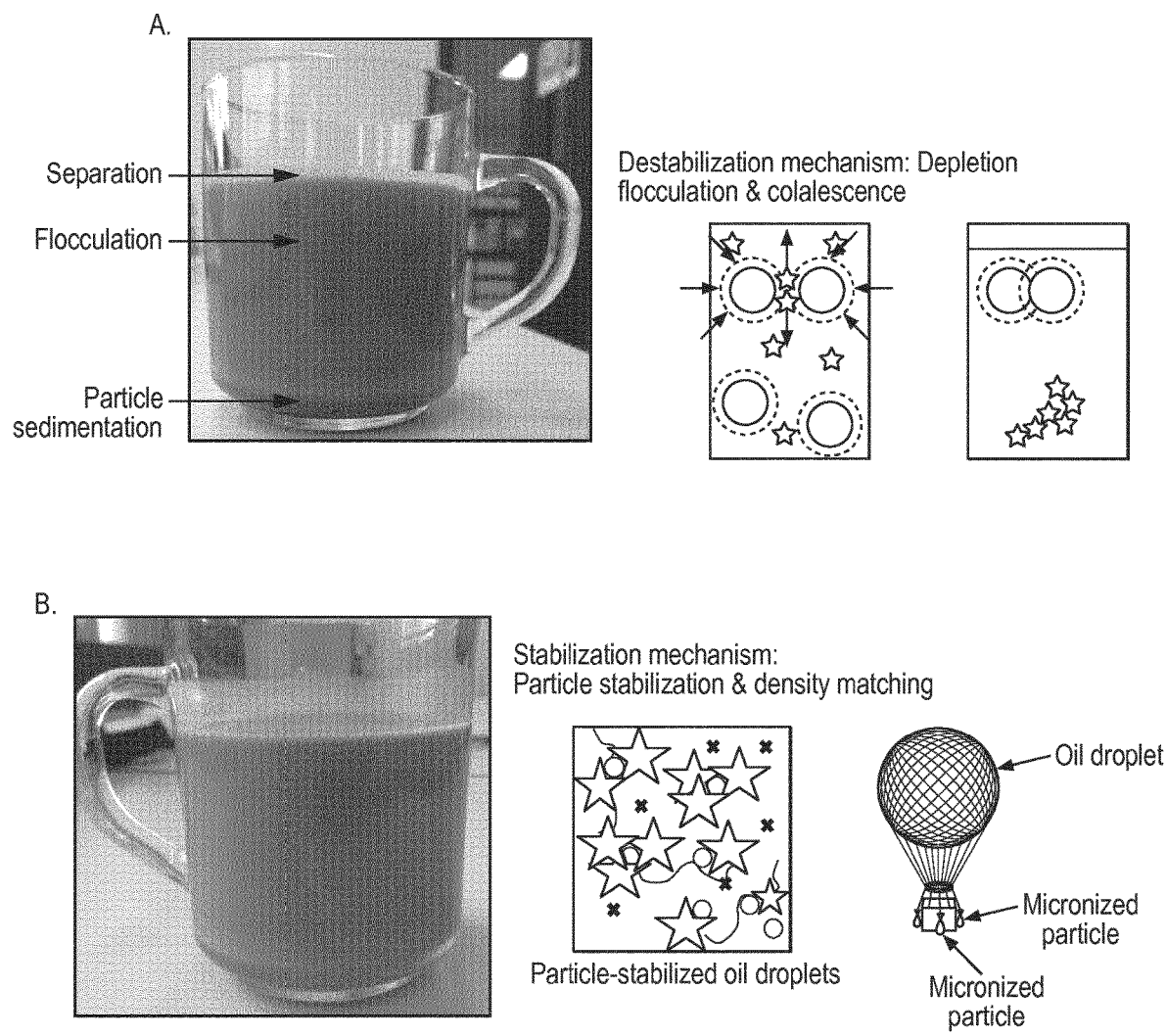
FIG. 1 shows a diagrammatic representation of the problem with methods illustrated in prior art such as dry mix grinding (A). This sample shows separation flocculation and sedimentation. While the sample of the present invention (B) shows a consistent uniform product which is achieved by encapsulating the plant seed particles in oil and introducing this to the creamer component as described below. The rounded particles represent the oil droplets in the emulsion. If the emulsion is not stable, the droplets merge together.

As mentioned above, the present invention relates to a process for providing plant seed based compositions with improved solubility and having an enhanced taste and/or aroma profile. Thus, an aspect of the present invention relates to a process for providing a plant seed composition, the process comprising
  a) mixing in a first mixing step an oil component with plant seed and grinding the plant seed in oil thereby providing a first composition comprising micronized plant seed incorporated in the oil component wherein the oil comprises palm kernel oil, canola oil, soy bean oil, sunflower oil, safflower oil, cotton seed oil, palm oil, milk fat, corn oil, high oleic variants of oils such as high oleic soybean, high oleic canola, high oleic safflower, high oleic sunflower oil, and/or coconut oil;
  b) providing an aqueous component comprising milk proteins, plant proteins or combinations thereof thereby providing a second composition,
  c) mixing in a second mixing step the first composition with the second composition and
  d) homogenising the composition thereby providing an oil-in-water emulsion.

In one embodiment the process comprises further steps of: adding a bulking and/or sweetener agent(s) to the oil-in-water emulsion; and pasteurizing or commercially sterilizing the oil-in-water emulsion. The bulking agent comprises maltodextrin and the sweetener agent comprises sugar, and/or combination of carbohydrates.

The advantage of the present invention is that the plant seeds can be used in its original form.

Processability and Stability of Beverage.

Prior art involves, separation of skin, cleaning, crushing of seeds, oil separation, followed by centrifugation step extraction of plant seed component in water, and insoluble part is discarded.

In our invention, whole raw material may be used and due to protective nature of oil the aroma can be trapednd use and thus to deliver a tasty beverage.

The term "plant seed(s)" relate to compounds containing high fat content typically in the range of 4-72%. Some examples include almonds (54% fat content), avocado (12% fat content), beech (50% fat content), brazilnut (67% fat content), cashew (42% fat content), chia (30% fat content), coconut (35% fat content), corn (4% fat content), cottonseed (40% fat content), evening primrose (17% fat content), hemp (35% fat content), hickory (69% fat content), candlenut (30% fat content), filbert (62% fat content), fig, Hazelnut, linseed (35% fat content), grape (20% fat content), macadamia (72% fat content), neem (40% fat content), olive (20% fat content), palm kernel (35% fat content), groundnut (48% fat content), pecan (71% fat content), pistachio (54% fat content), pumpkin (47% fat content), canola (30% fat content), rice bran (10% fat content), safflower (60% fat content), sesame (49% fat content), soybean (18% fat content), sunflower (47% fat content), walnut (60% fat content), wheatgerm (11% fat content), Lipid containing plant seeds like almonds, hazelnut, coconut, walnut, linseed, rapeseed or other nuts, kernels, date pits, are micronised into a base oil or fat like palm kernel oil, coconut oil, palm oil or other. Due to the incorporation of non-treated lipids the in mouth impact is significantly improved.

The advantages of the present invention over existing solutions are following:
  More efficient incorporation of plant based flavor compounds and proteins, as no intermediate process like drying, extraction or purification is required.
  More intensive use of natural raw materials (side streams)
  Improved flavor compared to dairy-protein based creamers or RTD beverages/milks
  Improved mouthfeel at equal fat content
  Stable suspension of plant particles at higher concentration (5% in final cup) without sedimentation
  Creaminess and mouthfeel are core business drivers and implementation can be immediate due to developments related to flavour
  The invention supports the use of natural less processed food ingredients at reduced cost and added consumer value.

The order of mixing the different components may vary. Preferably, the oil phase and an aqueous phase are prepared separately. Emulsifiers are usually mixed into the oil but may also be added to the aqueous phase. Protein and other milk proteins such as creamer components are dissolved in the aqueous phase. The two phases are then mixed and homogenized to produce an emulsion, which can be used in liquid form or dried. The plant seed particles may be incorporated into (and milled in) only a part of the oil and additional oil may be added afterwards. Thus, in an embodiment one or more further oil components are added after step d), such as before pasteurization and/or drying.

The plant seed particles are preferably micronized after addition to the oil (e.g. by milling), but the plant seed particles may also be provided to the oil in a micronized form.

Emulsifiers are preferably added to the first composition in step a), but it may also be added in other steps. Thus, in an embodiment the one or more emulsifiers are added
to the first composition in step a); and/or
to the aqueous component in step b); and/or
during the mixing step c); and/or
during the homogenisation step d).

The plant seed based composition of the invention may comprise low molecular weight emulsifiers. By a low molecular weight emulsifier is meant an emulsifier with a molecular weight below 1500 g/mol. Emulsions are thermodynamically unstable, and the phases of an emulsion will separate with time. By an emulsifier is meant a compound that stabilises the interface between the two phases of the oil-in-water emulsion and reduces the rate of phase separation. In an embodiment the emulsifiers are selected from the group consisting monoglycerides, diglycerides, acetylated monoglycerides, sorbitan trioleate, glycerol dioleate, sorbitan tristearate, propyleneglycol monostearate, glycerol monooleate and monostearate, sorbitan monooleate, propylene glycol monolaurate, sorbitan monostearate, sodium stearoyl lactylate, calcium stearoyl lactylate, glycerol sorbitan monopalmitate, diacetylated tartaric acid esters of monoglycerides, lecithins, lysolecithins, succinic acid esters of mono- and/or diglycerides, lactic acid esters of mono- and/or diglycerides, lecithins, lysolecitins, proteins and sucrose esters of fatty acids, lecithin (e.g. soy lecithin, canola lecithin, sunflower lecithin, and/or safflower lecithin), lysolecithins, and combinations thereof.

The mixing step a) may be performed by different means. In an embodiment the first mixing step a) is done by milling to micronize the plant seed component. In the present context the term "micronize" relates to a process wherein the particles are processed to particle sizes below 100 micrometers (μm), such as in the range 0.1-50 μm, such as in the range 1-30 μm, such as in the range 1-20 μm. Similar the term "micronized" relates to particles with an average particle size below 100 micrometers (μm), such as in the range 0.1-50 μm, such as in the range 1-20 μm, or such as in the range 1-20 μm. Milling is preferably performed in a ball mill by wet milling or dry milling. In one embodiment of the invention, the first mixing step a) is done by milling to micronize the plant seed component. The milling may be for instance a roller milling of plant seed in oil or melted fat or impact milling of plant seed into oil.

The oil component of step a) may be selected from different sources that is added to this mixing step. In one embodiment the oil component of step a) comprises oil selected from the group consisting of palm kernel oil, canola oil, soy bean oil, sunflower oil, safflower oil, cotton seed oil, palm oil, milk fat, corn oil, high oleic variants of oils such as high oleic soybean, high oleic canola, high oleic safflower, high oleic sunflower oil, and/or coconut oil. The oil is preferably present in the creamer composition in an amount of at most about 50% (weight/weight), the amount of oil in the creamer composition may e.g. be between 1% and 40% (weight/weight), such as in the range 5-40%, such as in the range 10-40, such as in the range 5-30%, or such as in the range between 10-30%. In the present context when oil is included in the weight/weight percentages the % relates to the non-water part but including oil (solid content+ oils). The total amount of oil component comprising micronized plant seed therein in the aqueous composition may also vary. Thus, in yet a further embodiment the aqueous composition comprises at least 5% (w/w) of the oil component comprising micronized plant seed therein, such as in the range 5-50%, such as 5-40%, such as 5-30%, such as in the range 5-20%, or such as in the range 5-15%. In another embodiment the aqueous composition comprises at least 20% (w/w) of the oil component comprising micronized plant seed therein. It is to be understood that these weight % includes both the oil and the micronized plant seed therein.

In the context of the present invention, mentioned percentages are weight/weight percentages of dry solids (on a dry matter basis) unless otherwise stated.

The process of the invention also includes the addition of a creamer component, preferably in an aqueous form. By a creamer composition/is meant a composition that is intended to be added to a food composition, such as e.g. coffee, to impart specific characteristics such as colour (e.g. whitening effect), flavour, texture, mouthfeel and/or other desired characteristics. Thus the plant seed based composition as provided by this invention can also be used as a creamer. The creamer component provided in step b) is in a liquid form, but the final creamer composition of the invention may be in a liquid form or in a powdered (dry) form. In the present context dried plant seed is to be understood as having moisture content below 10%, preferably below 5% or more preferably below 3% water.

The creamer component may be any ingredient or combination of ingredients useful for inclusion in an aqueous composition. Thus, in an embodiment the aqueous component of step b) comprises a protein, a hydrocolloid, a buffering agent, and/or a sweetener.

The aqueous component preferably comprises protein in the range 0.5-15%, such as 1.5-10% such as 1.5-5% preferably between about 0.1-3% protein, such as between about 0.2-2% protein, more preferably between about 0.5% (weight/weight) and about 1.5% protein.

The protein may be any suitable protein, e.g. milk protein, such as casein, caseinate, and whey protein; vegetable protein, e.g. soy and/or pea protein; and/or combinations thereof. The protein is preferably sodium caseinate. The protein in the composition may work as an emulsifier, provide texture, and/or provide whitening effect. Too low levels of protein may reduce the stability of the liquid creamer. At too high protein levels the viscosity of the product may be higher than desired and too high for liquid processing.

The aqueous component may comprise a hydrocolloid. Hydrocolloids may help to improve physical stability of the composition. Suitable hydrocolloids may e.g. be carrageenan, such as kappa-carragenan, iota-carragenan, and/or lambda-carragenan; starch, e.g. modified starch; cellulose, e.g. microcrystalline cellulose, methyl cellulose, or carboxymethyl cellulose; agar-agar; gelatine; gellan (e.g., high acyl, low acyl); guar gum; gum Arabic; kojac; locust bean gum; pectin; sodium alginate; maltodextrin; tracaganth; xanthan; or a combination thereof.

The aqueous component of the present invention may further include a buffering agent. The buffering agent can prevent undesired creaming or precipitation of the creamer upon addition into a hot, acidic environment such as coffee. The buffering agent can e.g. be monophosphates, diphosphates, sodium mono- and bicarbonates, potassium mono- and bicarbonates, or a combination thereof. Preferred buffers are salts such as potassium phosphate, dipotassium phosphate, potassium hydrophosphate, sodium bicarbonate, sodium citrate, sodium phosphate, disodium phosphate, sodium hydrophosphate, and sodium tripolyphosphate. The buffer may e.g. be present in an amount of about 0.1 to about 3% by weight of the creamer.

The aqueous component of the present invention may further include one or more additional ingredients such as flavors, sweeteners, colorants, antioxidants (e.g. lipid antioxidants), or a combination thereof. Sweeteners can include, for example, sucrose, fructose, dextrose, maltose, dextrin, levulose, tagatose, galactose, corn syrup solids and other natural or artificial sweeteners. Sugarless sweeteners can include, but are not limited to, sugar alcohols such as maltitol, xylitol, sorbitol, erythritol, mannitol, isomalt, lactitol, hydrogenated starch hydrolysates, and the like, alone or in combination. Usage level of the flavors, sweeteners and colorants will vary greatly and will depend on such factors as potency of the sweetener, desired sweetness of the product, level and type of flavor used and cost considerations. Combinations of sugar and/or sugarless sweeteners may be used. In one embodiment, a sweetener is present in the creamer composition of the invention at a concentration ranging from about 5-90% by weight of the total composition, such as in the range 20-90%, preferably such as 20-70%. In another embodiment, the sweetener concentration ranges from about 40% to about 60% by weight of the total composition. In a preferred embodiment the sweetener of step e) is glucose syrup.

In a preferred embodiment the aqueous component comprises sodium caseinate, dipotassium phosphate, sodium hexametaphosphate, trisodium citrate, sodium chloride and water. In yet an embodiment the aqueous component of step b) is a non-dairy creamer. When sodium caseinate is processed, it is so materially altered that both dairy scientists and government regulators no longer regard it as a true dairy substance. This is why sodium caseinate can be an ingredient in non-dairy products according to FDA's regulation.

Examples of typical aqueous compositions are presented in tables 1-3 below.

TABLE 1

Non-dairy creamers

| Ingredients (in % by weight) | Non-dairy (NDC) | | |
| --- | --- | --- | --- |
| | LOW FAT | REGULAR | HIGH FAT |
| Milk solids non-fat (SNF) | no | no | no |
| Casein/caseinate | 1.5-3.0 | 1.5-3.0 | 1.5-3.0 |
| Lactose/sweet whey | no | 110 | no |
| Glucose syrup | 80-90 | 50-60 | 40-50 |
| Milk fat | no | no | no |
| Vegetable fat | 10-20 | 30-35 | 40-45 |
| Emulsifiers | yes | yes | yes |
| Buffer salts | yes | yes | yes |
| Flavours | optional | optional | optional |
| Colorants | optional | optional | optional |
| Flowing agents | optional | optional | optional |
| Moisture | 1-3 | 1-3 | 1-3 |

TABLE 2

Filled dairy creamers

| Ingredients (in % by weight) | Filled dairy (FDC) | | |
| --- | --- | --- | --- |
| | LOW FAT | REGULAR | HIGH FAT |
| Milk solids non-fat (SNF) | 70-90 | 20-40 | 20-40 |
| Casein/caseinate | optional | optional | optional |
| Lactose/sweet whey | 0-10 | 20-40 | 20-40 |
| Glucose syrup | optional | optional | optional |
| Milk fat | no | no | no |
| Vegetable fat | 0-10 | 25-30 | 35-40 |
| Emulsifiers | no | no | no |
| Buffer salts | yes | yes | yes |
| Flavours | optional | optional | optional |
| Colorants | optional | optional | optional |
| Flowing agents | optional | optional | optional |
| Moisture | 1-3 | 1-3 | 1-3 |

TABLE 3

Full dairy creamers

| Ingredients (in % by weight) | Full dairy |
| --- | --- |
| Milk solids non-fat (SNF) | 30-40 |
| Casein/caseinate | optional |
| Lactose/sweet whey | 0-40 |
| Glucose syrup | no |
| Milk fat | 15-30 |
| Vegetable fat | No |
| Emulsifiers | no |
| Buffer salts | yes |
| Flavours | optional |
| Colorants | optional |
| Flowing agents | optional |
| Moisture | 1-3 |

The skilled person may produce other variants of creamers. Thus, the above creamer compositions are mere examples of aqueous compositions.

The process may also include a pasteurizing step. Thus, in yet another embodiment the pasteurizing step is performed at a minimum temperature of 81° C. for at least 5 seconds. The plant seed based composition as obtained after the pasteurizing step can be used for making RTD beverages. The process may also include a drying step. Thus, in a further embodiment the drying step is performed by spray drying, vacuum band drying, roller drying or freeze drying. The plant seed composition as obtained after the drying step can be used for making creamers for use in beverage industry for example as milk additive for coffee and tea beverage. The plant seed based composition after dry mixing may be used to make beverage powders such a flavour based beverages, bakery and culinary products for retail purposes. Such plant seed based composition may also be used for preparation of capsules to be used in a beverage dispenser.

As previously mentioned the plant seed composition may also be in a dried form. Therefore in yet an aspect the invention relates to an oil-in-water emulsified dry plant seed composition comprising an oil component comprising micronized plant seed incorporated therein; and an aqueous component, e.g. comprising sodium caseinate.

The amount of micronized plant seed may also be defined in relation to the amount of oil in which it is incorporated. Thus, in another embodiment the weight/weight ratio (or ratio by weight) between the amount of micronized plant seed incorporated in the oil to the amount of oil is in the range 0.01:1-2:1, such as 0.05:1-2:1, such as 0.1:1-2:1, such as 0.1:1-1:1, such as 0.4:1-1:1, such as 0.6:1-1:1, such as 0.8:1-1, or such as 1:1.

In the context of the present invention, the terms "ratio by weight" "(weight/weight)" or "weight/weight ratio" refers to the ratio between the weights of the mentioned compounds. It is to be understood that the plant seed based compositions of the invention may both be in a dry format (moisture content below 10%, preferably below 5%, and even more preferably below 3%) or in a liquid state.

Examples of preferred plant seed based compositions of the invention include:

A plant seed based composition according to the invention comprising
- 5-50% (w/w) of the oil component comprising micronized plant seed incorporated therein, wherein the micronized plant seed constitutes 2.5-70% of the total weight of the oil component comprising micronized plant seed incorporated therein; and
- one or more protein components, e.g. including sodium caseinate.

A plant seed based composition according to the invention comprising
- 5-50% (w/w) of the oil component comprising micronized plant seed incorporated therein, wherein the micronized plant seed constitutes 2.5-70% of the total weight of the oil component comprising micronized plant seed incorporated therein; and
- 10-50% (w/w) of one or more protein components, e.g. including sodium caseinate.

A plant seed based composition according to the invention comprising
- 5-50% (w/w) of the oil component comprising micronized plant seed incorporated therein, wherein the micronized plant seed constitutes 2.5-70% of the total weight of the oil component comprising micronized plant seed incorporated therein;
- 10-50% (w/w) of one or more protein components, e.g. including sodium caseinate; and
- 10-70% (w/w) of a sugar source, such as glucose syrup.

In one embodiment of the present invention the plant seed is almond, peanut or coconut.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

Example 1

Process for Providing a Ready-to-Drink (RTD) Beverage
Methods

Figure 2:
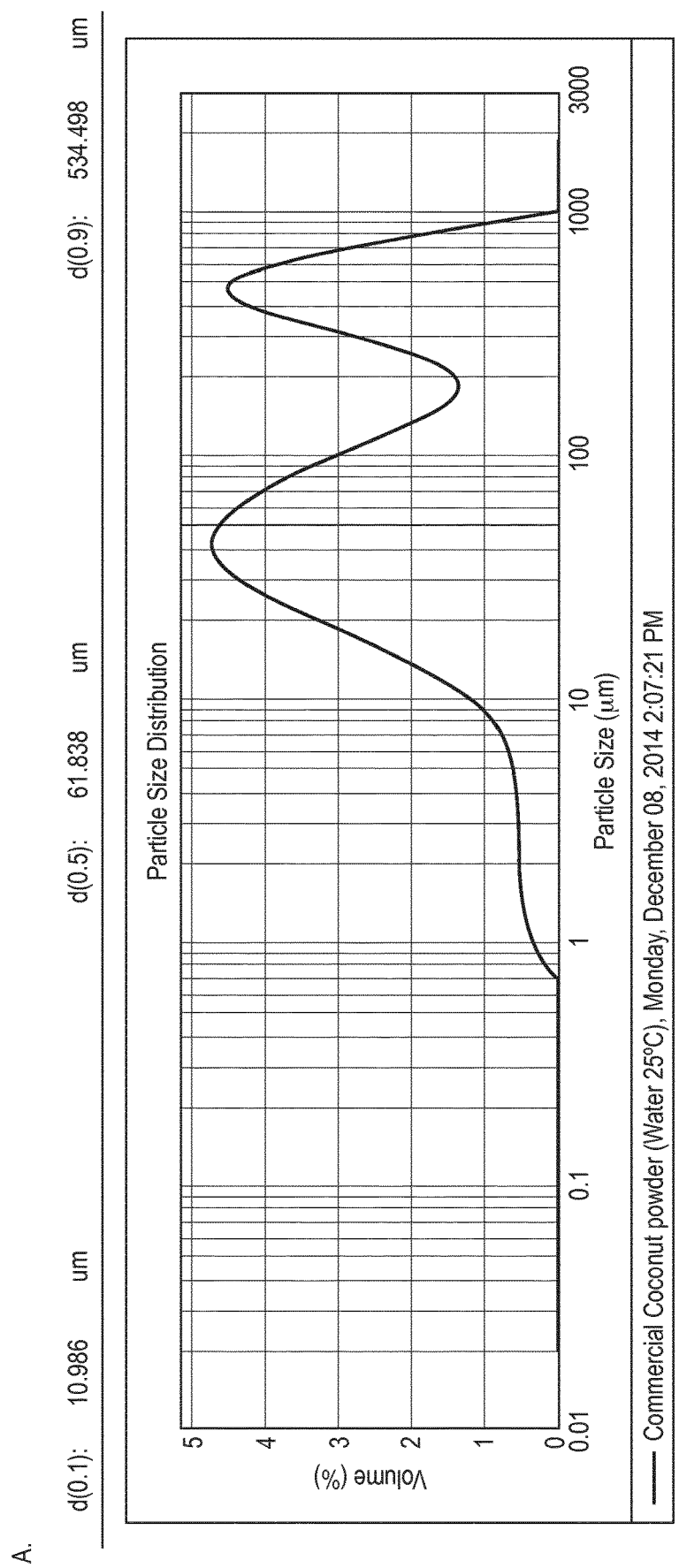
FIG. 2 shows the size distribution of coconut particles. 2A: commercial coconut powder. 2B: dispersion of coconut powder in oil after pregrinding step. 2C: Light microscopic image of the dispersion characterized in FIG. 2B. 2D: Coconut particles micronized in oil by bead milling. 2E: Light microscopic image of the dispersion characterized in FIG. 2D. 2F: Dry micronized reference coconut powder.
Figure 2:
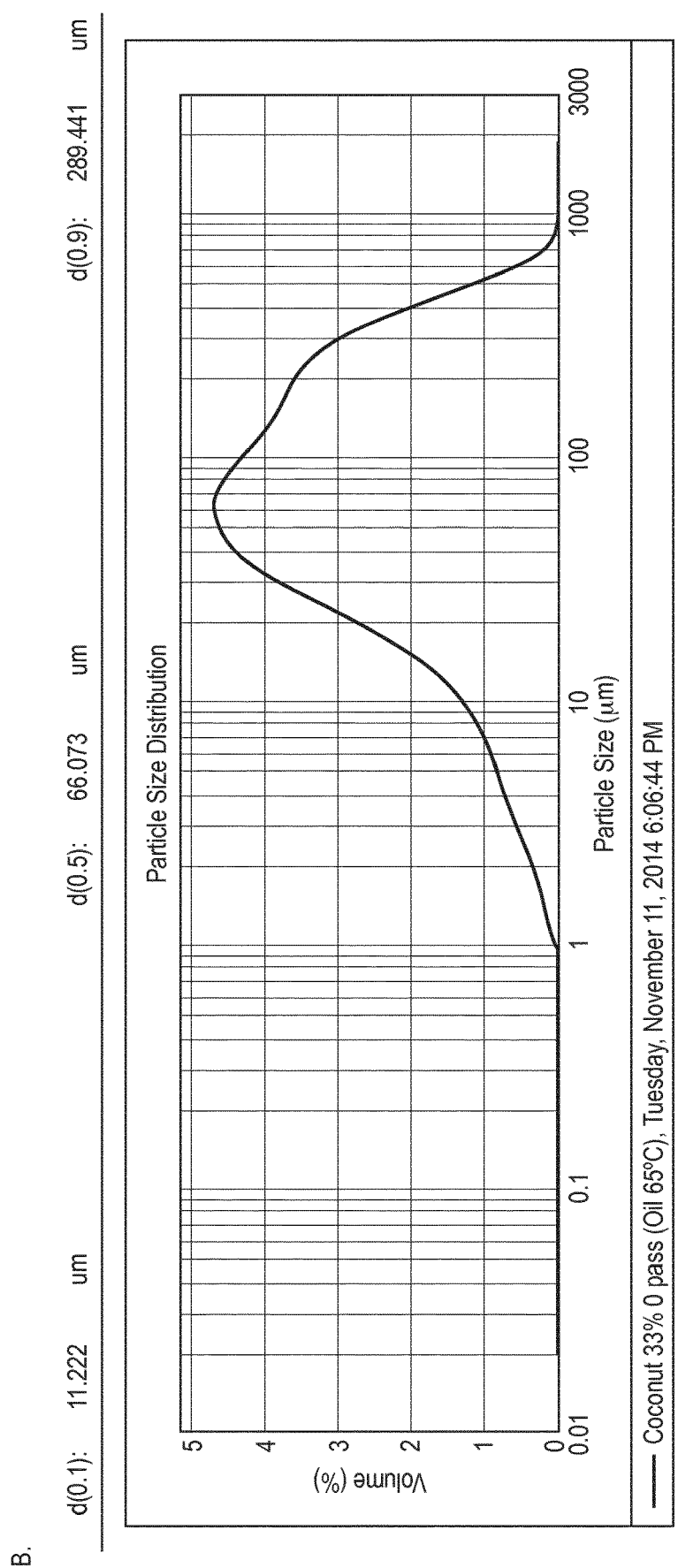
Figure 2:
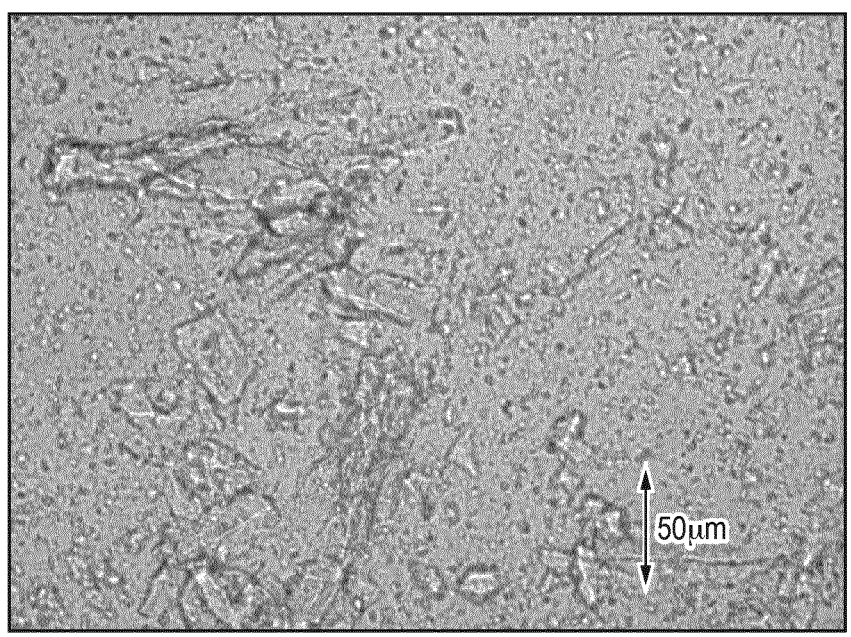
Figure 2:
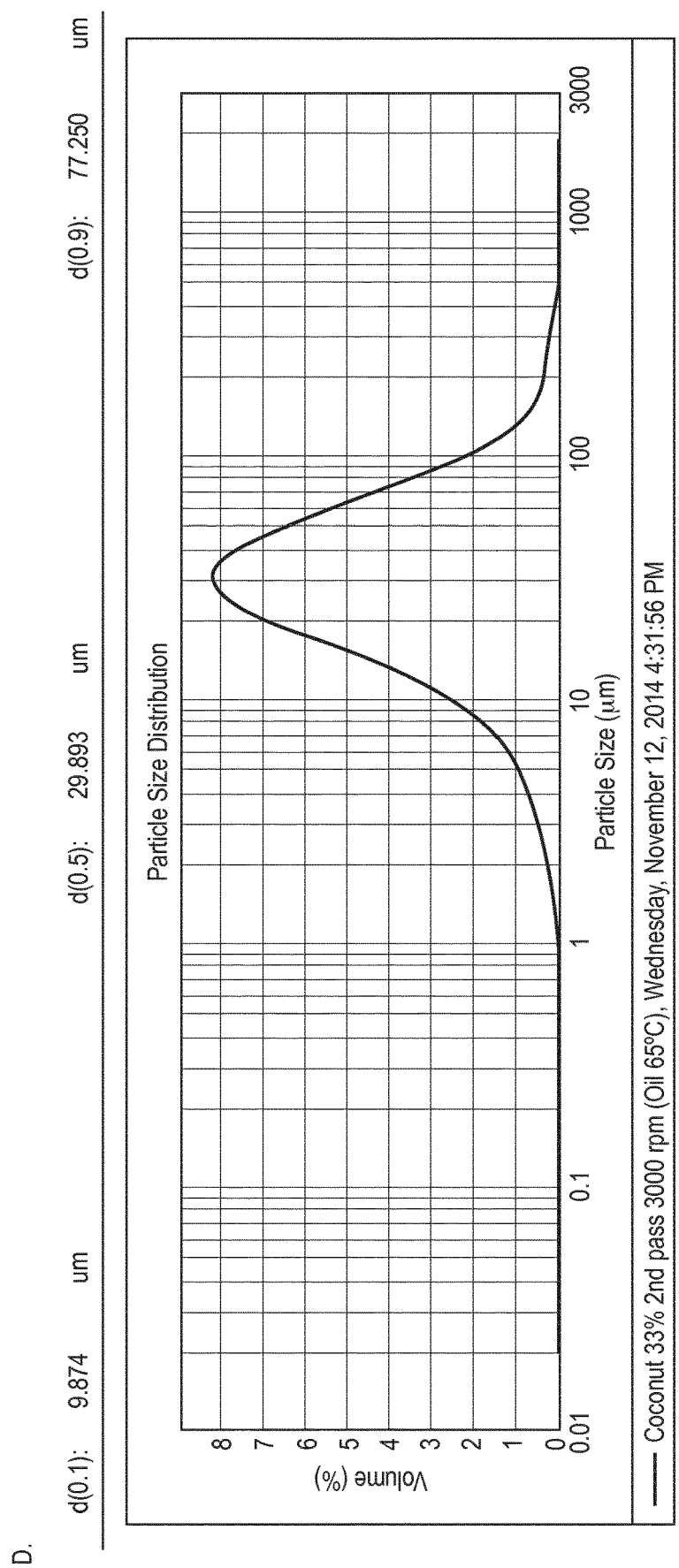
Figure 2:
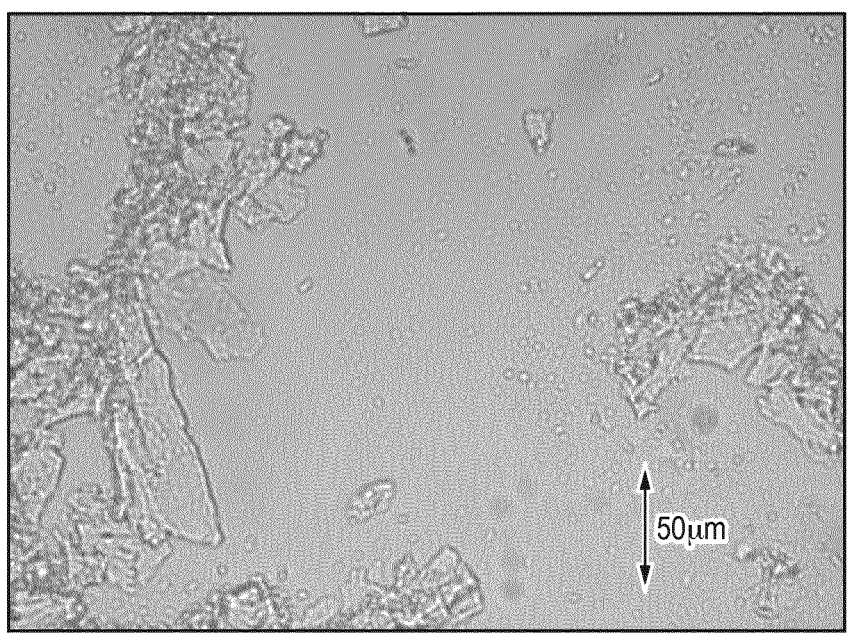
Figure 2:
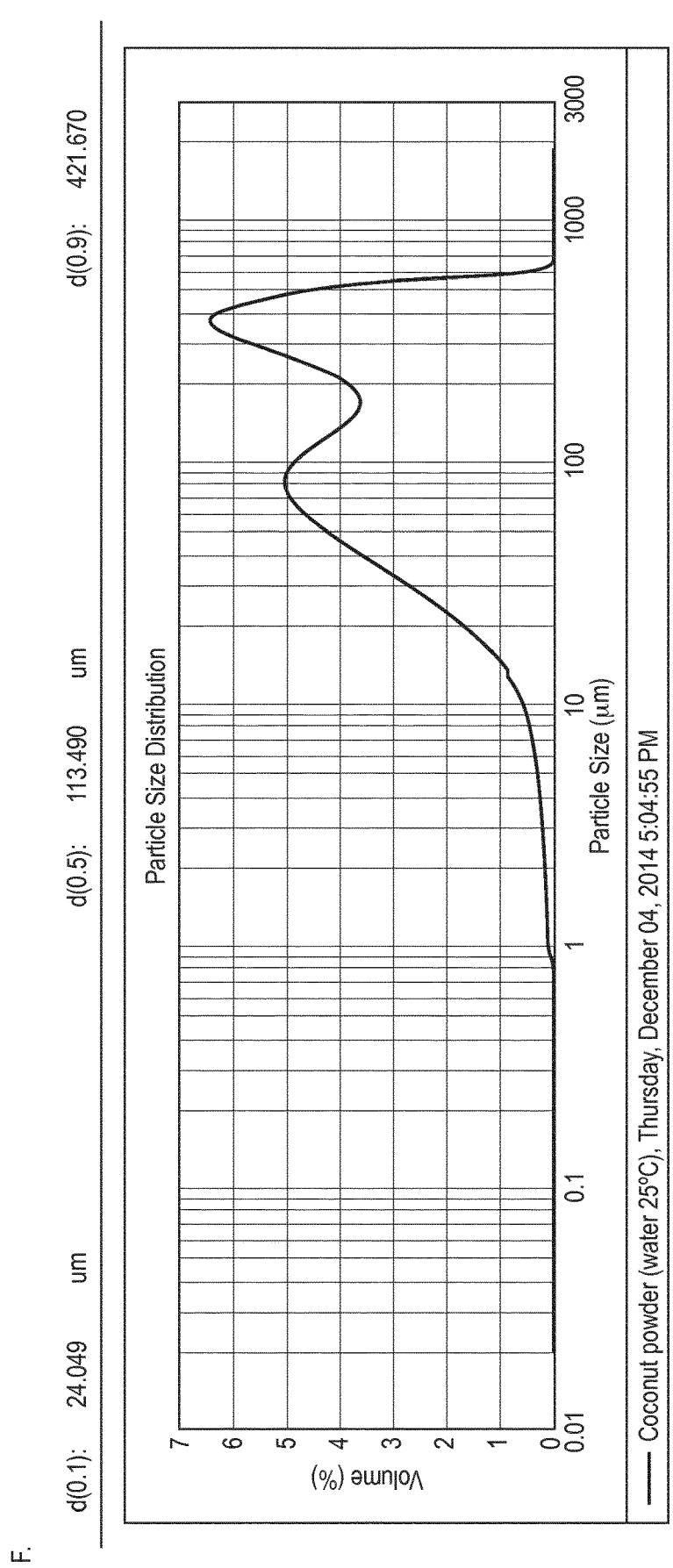

Coconut powder (particle size distribution given in FIG. 2A) was milled in a pregrinding step in a colloid mill (Fryma MZ-80). Coconut powder (at room temperature) is mixed into palm kernel oil at T=55° C. for 20 min until coconut chips are fully dispersed.

The mix is then milled in 5 passes, gradually reducing the outlet gap size to the minimum. The obtainable particle size distribution is given in FIG. 2B and illustrated in a microscopic image in FIG. 2C.

This fine coconut dispersion is then micronized in a second milling step using a wet bead mill (Hosokawa Alpine Hydro-Mill 90 AHM, T=65° C., zirconium oxide bead 1.7/1.9 mm, 3000 RPM, TS33).

After two passages through the mill the size distribution of the micronized particles is characterized by a $d_{90,3}$ of 77 µm, i.e 90% of the mass belongs to particles with a diameter smaller than 77 micrometers. The corresponding particle size distribution is given in FIG. 2D and illustrated in a microscopic image in FIG. 2E.

In parallel skim milk (95%) and sugar (5%) were mixed and stirred in a vessel at 50° C.

Both the oily and the aqueous preparation were then mixed and stirred at 50° C. The final mix was pre-heated (80° C.), subjected to UHT treatment by direct steam injection (APV-HTST at 145° C. during 5 sec), flash-cooled to 80° C. and homogenized (APV-HTST).

The final liquid beverage contains 93.5% skim milk, 4% sugar, 2% fat and 0.5% micronized coconut powder.

A reference coconut RTD beverage at equal composition was prepared, where the coconut was not added via the oil phase as described in the current invention, but mixed into the skim milk together with the sugar. The particle size distribution of the dry milled reference coconut powder is shown in FIG. 2F. It is characterized by a $d_{90,3}$ of 422 µm.

Sedimentation Test

The beverage samples were poured into in a cup at T=25° C. The beverage was allowed a settling time of 5 minutes and the sedimentation test was done by measuring the mass of sediments in the cup on a submersed plate using a sedimentation balance: Mettler Toledo XP404S Excellence Plus with Density Determination Kit. Balance Link Software V 4.02. The cup with the immersed plate is shown in FIG. 3 A.

Results

Figure 3:
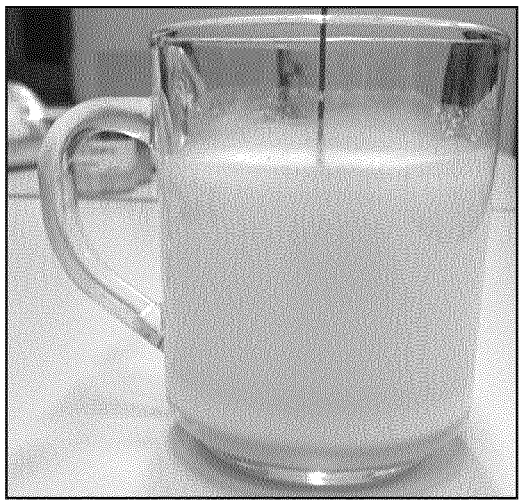
FIG. 3: Cup with the immersed plate for measuring mass of sediments (FIG. 3A), plate with sediments after 5 minutes time for the beverage containing coconut particles micronized in oil (FIG. 3B) and reference beverage made with dry milled coconut particles (FIG. 3C). Mass of sediments versus time for both the reference beverage and the beverage containing coconuts micronized in oil (FIG. 3D).
Figure 3:
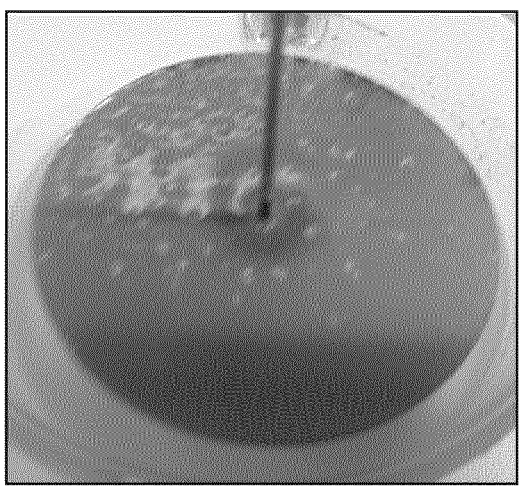
Figure 3:
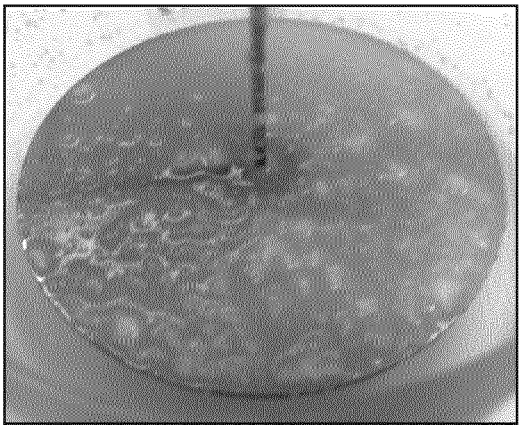
Figure 3:
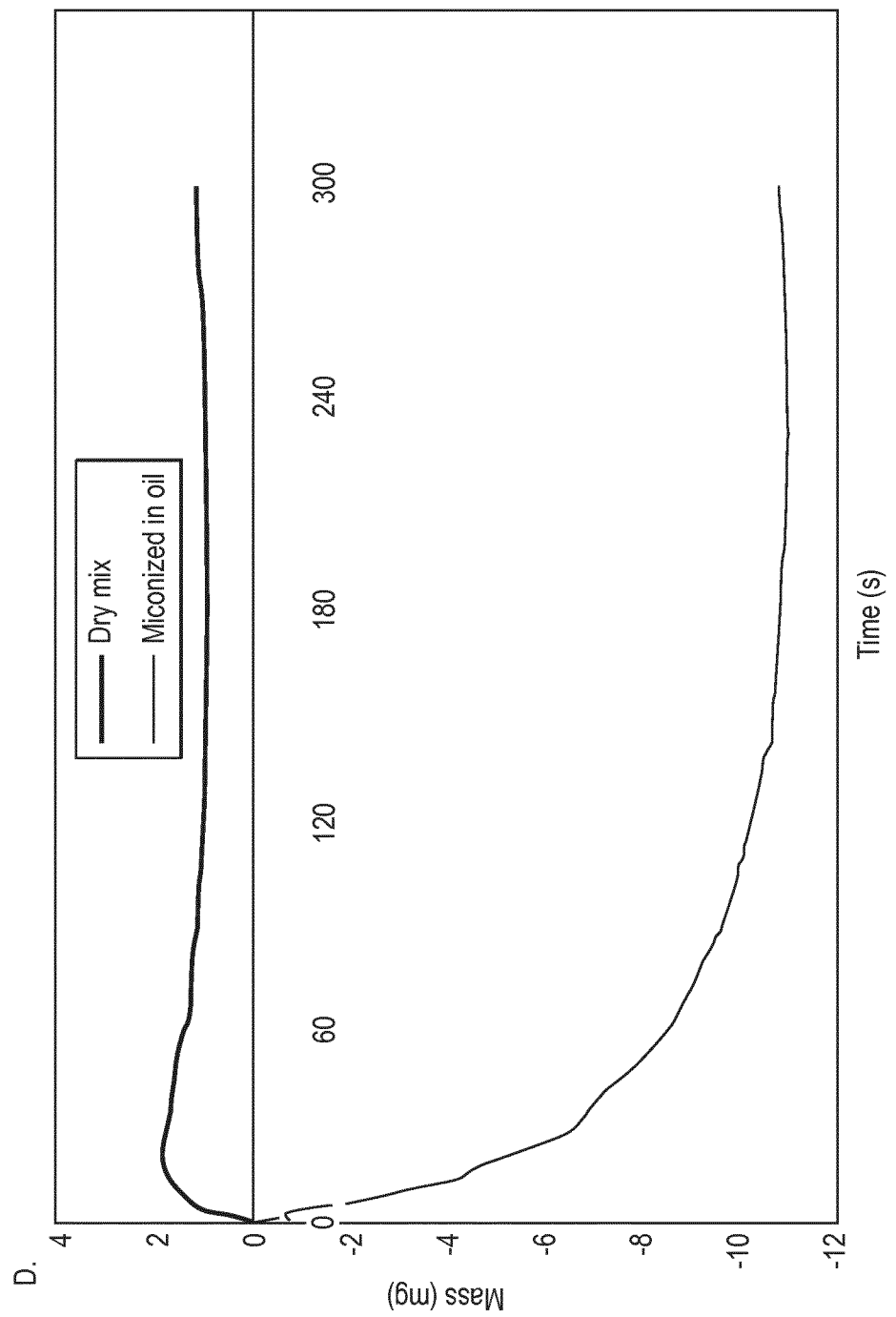

Measurement of mass of sediments in the cup on submersed plate is shown on FIG. 3 B for the current invention and in FIG. 3 C for a reference RTD beverage with dry-milled coconut pieces mixed into the preparation. Based on continuous and quantitative measurement of particle sedimentation in the cup with the help of the sedimentation balance, the stability of the dispersion of the micronized particles in the RTD beverage preparation can be evaluated. The result is presented in FIG. 3 D. While an increase of the sedimented coconut particle mass for the reference sample (dispersion of dry milled coconut particles into the RTD beverage preparation) is observed, the product according to the current invention (i.e. coconut micronized in oil) does not settle within 5 min time. The mass on the sedimentation balance even decreases slightly, as some light particles move upwards, driven by buoyancy as illustrated in FIG. 1. Very few sediments are found on the immersed plate for the micronized coconut in oil sample.

Example 2

Process for Providing a Creamer
Methods

Almond powder (particle size distribution given in FIG. 5A) was milled in a pregrinding step using a Fryma MZ-80 colloid mill. Almond powder (at room temperature) was incorporated into palm kernel oil at 55° C. and mixed for 15 minutes until the almonds were fully dispersed. The dispersion is then milled in 3 passes (1st pass: outlet gap fully opened (3 mm), 2nd pass: gap at 0.8 mm, 3rd pass: minimum gap) to obtain a fine ground dispersion of almond in palm kernel oil. The obtainable particle size distribution is given in FIG. 5 B and illustrated in a microscopic image in FIG. 5C.

The dispersion of almonds in palm kernel oil is then micronized in a second milling step using a wet bead mill (Hosokawa Alpine Hydro-Mill 90 AHM, T=65° C., zirconium oxide bead 1.7/1.9 mm, 3000 RPM, TS33).

After one passage through the mill the size distribution of the micronized particles is characterized by a $d_{90,3}$ of 27 μm, i.e 90% of the mass belongs to particles with a diameter smaller than 27 micrometers. The particle size distribution of almonds micronized in oil as described above is given in FIG. 5D and illustrated in a microscopic image in FIG. 5E.

The oil containing micronized almond particles was then mixed with monoglyceride Dimodan™ and Panodan™ (Dupont). In parallel typical non-dairy creamer ingredients (sodium caseinate, dipotassium phosphate, sodium hexametaphosphate, trisodium citrate, and sodium chloride) were mixed in water and stirred in a vessel at 50° C.

These two mixes were then mixed and stirred at 50° C. with the addition of glucose syrup. The final mix was homogenized (APV-HTST) and pasteurized (APV-HTST at 85° C. during 5 sec). The pasteurized mix was then spray-dried (NIRO SD-6.3-N) at 160° C.

In this example, 5% of the final creamer dry weight is represented by almond particles added via the oil phase.

Sensory Data

The sensory characteristics of almond creamer composition were judged by sensory panellists. The creamer preparation according to the present invention (#403) was evaluated versus a reference sample (#782) at equal composition. For the reference sample 5% micronized almond powder was added in a dry mixing step to a reference creamer preparation made with palm kernel oil (35%).

It was found by the panel that the composition of the present invention exhibited a smooth and stable suspension with enhanced almond flavor and aromas. The creamer containing almonds micronized in oil was perceived to have more body and to be less watery than the reference sample at equal composition. Sedimentation was absent during consumption as described above. Detailed observations are represented in Table 4.

TABLE 4

Sensory evaluation results.

| Sample | Flavor | Mouthfeel |
| --- | --- | --- |
| #403 Almonds micronized in oil | Almond Meaty Coffee Roasty | Astringent More body Less watery than ref |
| #782 Almonds (reference) | Milky More sweet More fatty Nutty roasty | More fatty More watery Coating effect Watery Thin |

Protocol

Samples were coded with a 3-digit number, presented in the same order by all the participants. The samples were blinded for the participants, except for the Sensory Analyst and the Experimental Kitchen team leading the session.

Participants were provided with a paper questionnaire and asked to describe each sample as exhaustively as possible using descriptive non-hedonic words.

Participants tasted the samples individually and in the same order.

The samples were tested by pairs.

After each pair of samples the participants shared their comments with the group and discussed on the samples one by one.

There was a pause in between each tasted sample. During that time participants had to rinse their mouth with Vittel water.

At the end of the session all the comments were summarized and discussed.

Confocal Microscopy

Samples of the reconstituted creamer preparation were analysed under a confocal microscope (LSM710, Zeiss). Samples have been stained with:

Nile red (Sigma # Sigma N3013) for fat staining at 488 nm excitation wavelength

Figure 5:
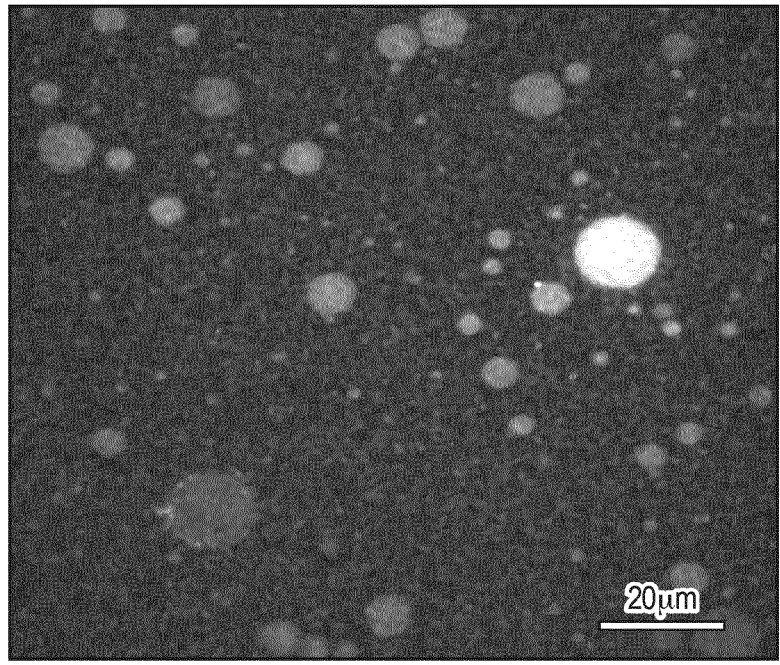
FIG. 5: Confocal microscope images showing the interface of oil droplets (red) emulsified in water. 5A: Reconstituted reference beverage containing dry-milled almond particles. No stabilization of the oil/water interface can be seen. 5B: Reconstituted beverage containing almond particles micronized in oil. White arrows point at protein-rich particles adsorbed at the oil-water interphase that stabilize the emulsion. Such particles cannot be found in the reference beverage.
Figure 5:
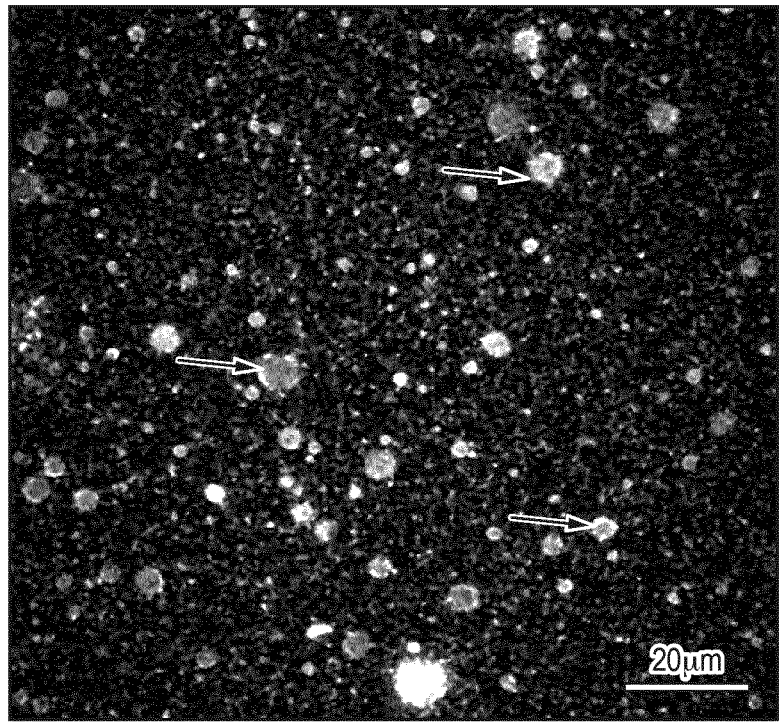

Fast green FCF (Serva electrophoresis # SVA2129502) for protein staining at 633 nm excitation wavelength Microscopy pictures of reconstituted creamer samples containing almond particles are presented on FIG. 5.

FIG. 5A: Reference sample (dispersion of dry micronized almond particles into the creamer preparation). FIG. 5B: Reconstituted creamer containing almond particles micronized in oil Microscopy Results The confocal microscopy pictures presented on FIG. 5B show an intense signal next to the oil droplets surface when the particles have been milled in oil whereas no specific signal is observed in the case of the reference sample (FIG. 5A). The presence of the particles next to the oil/water interface contributes to a better stabilization of the beverages making the entity "in-oil micronized almond particle attached to oil droplet" heavier (i.e. increase in density) than the single oil droplet and lighter than the particle itself (per unit volume). In these conditions, oil covered micronized almond particle sedimentation is prevented due to density match. In addition, no visual flocculation of particles is observed.

It was found by the panel that the composition of the present invention exhibited a smooth and stable suspension with enhanced almond flavor and aromas. The creamer containing almonds micronized in oil was perceived to have more body and to be less watery than the reference sample at equal composition.

Example 3

Process for Providing a Creamer

Methods

Figure 6:
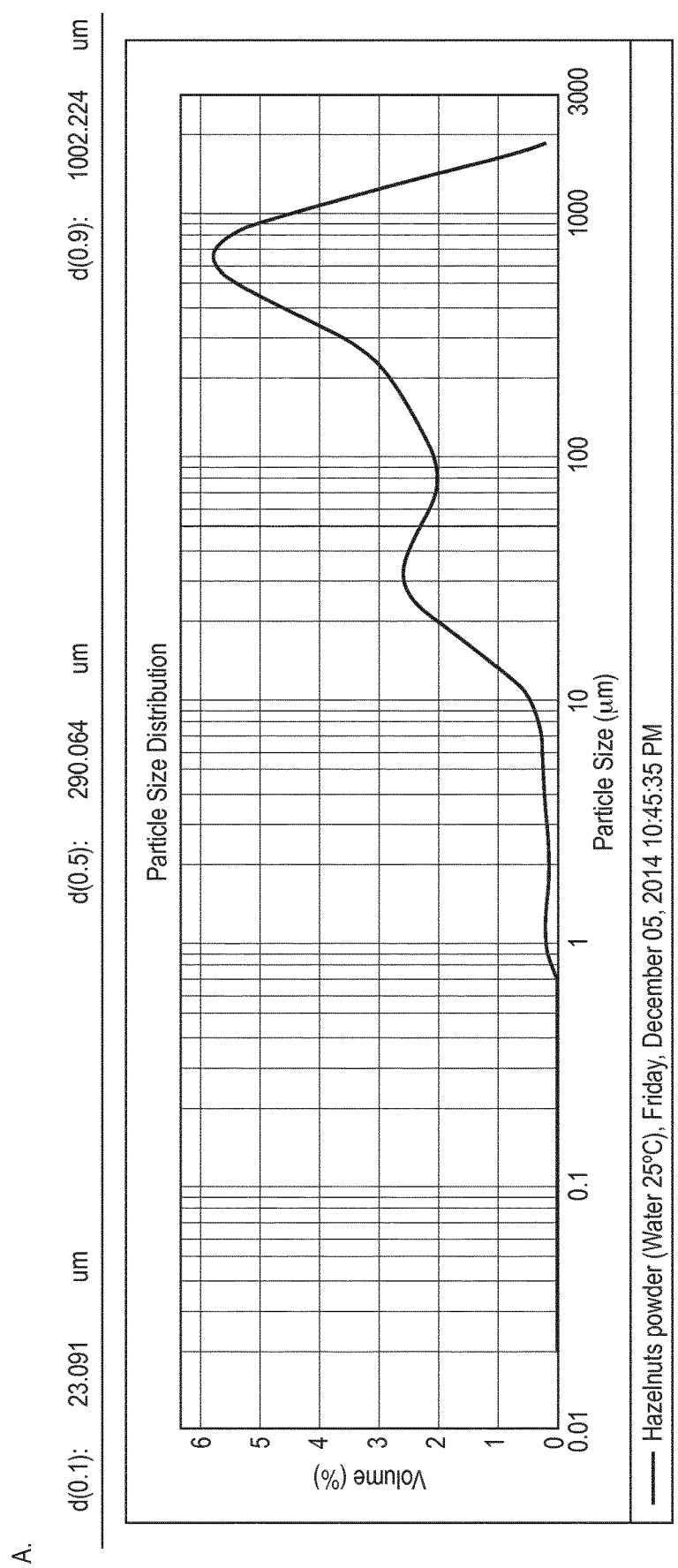
FIG. 6 shows the size distribution of hazelnut particles. 6A: commercial powder. 6B: dispersion of hazelnut powder in oil after pregrinding step. 6C: Light microscopic image of the dispersion characterized in FIG. 6B. 6D: Hazelnut particles micronized in oil by bead milling. 6E: Light microscopic image of the dispersion characterized in FIG. 6D.
Figure 6:
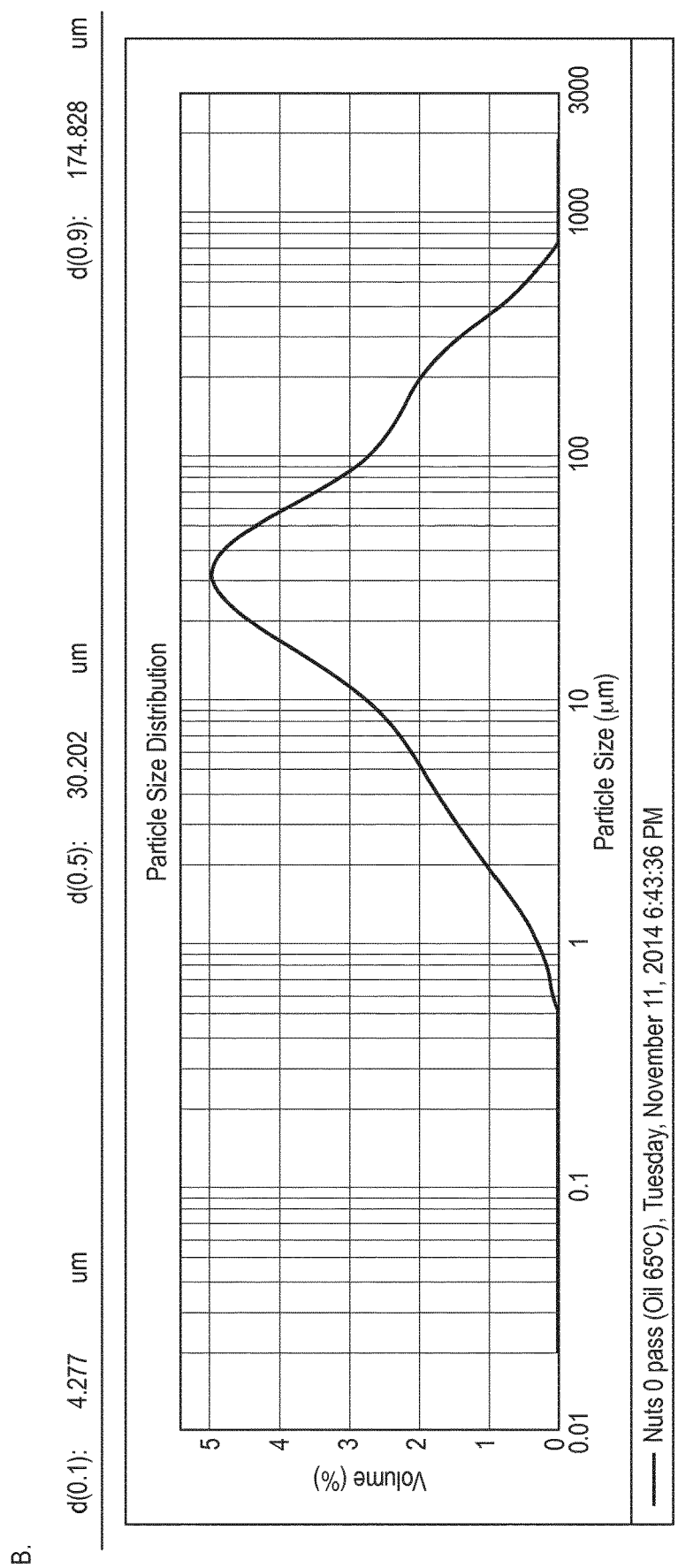
Figure 6:
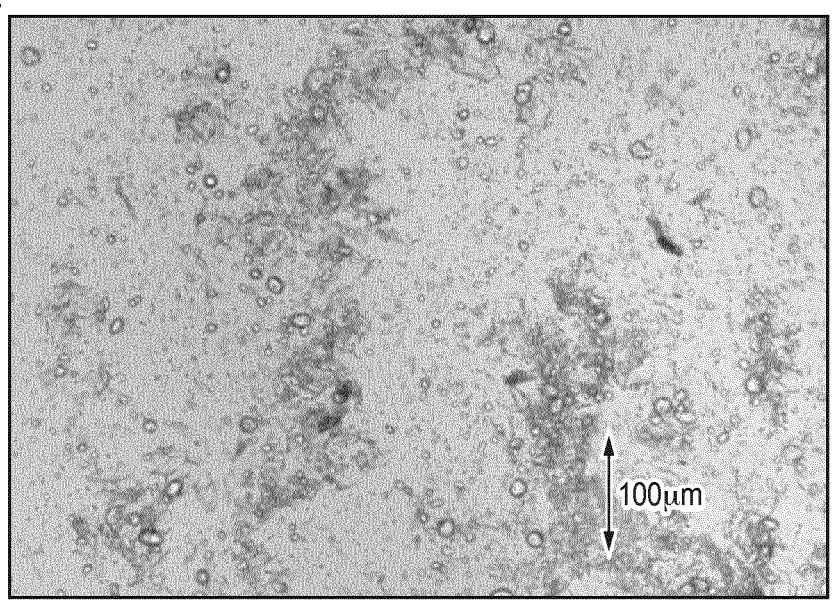
Figure 6:
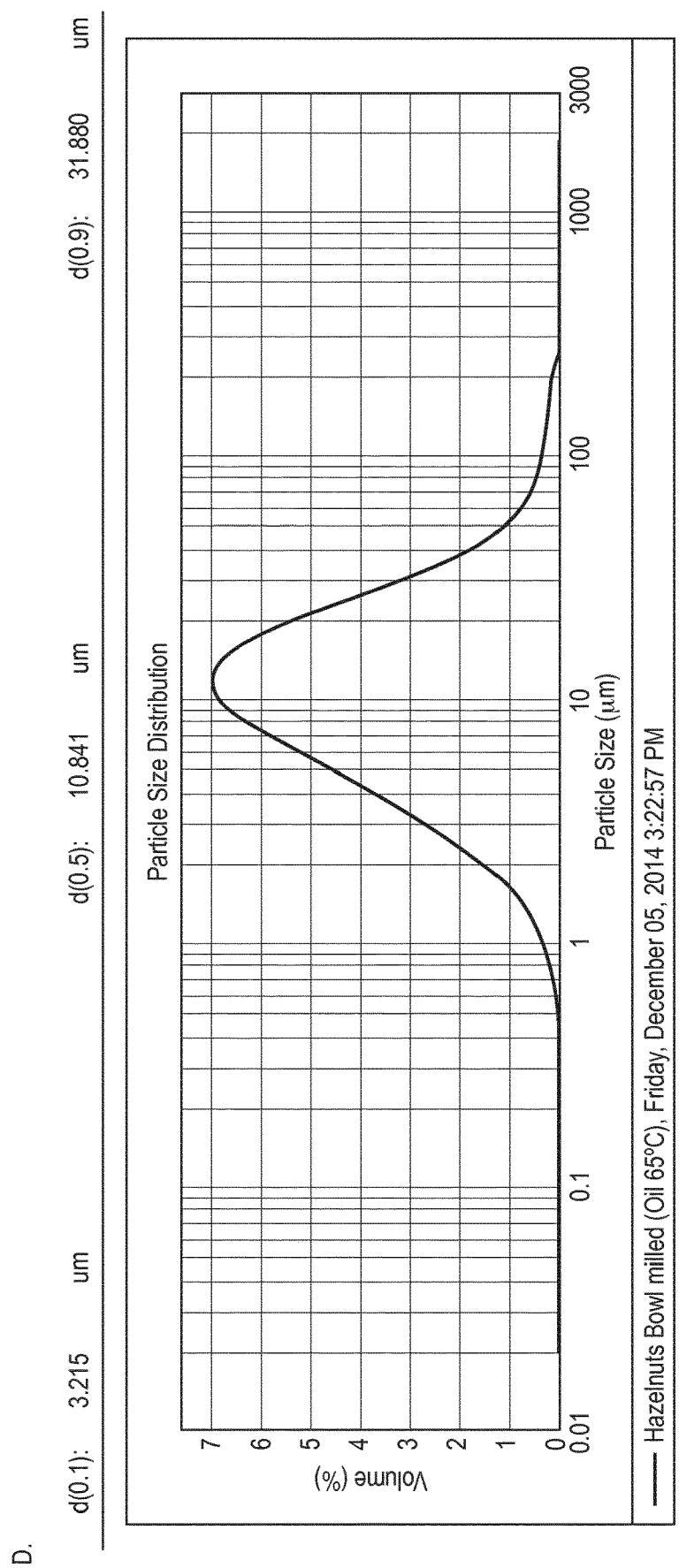
Figure 6:
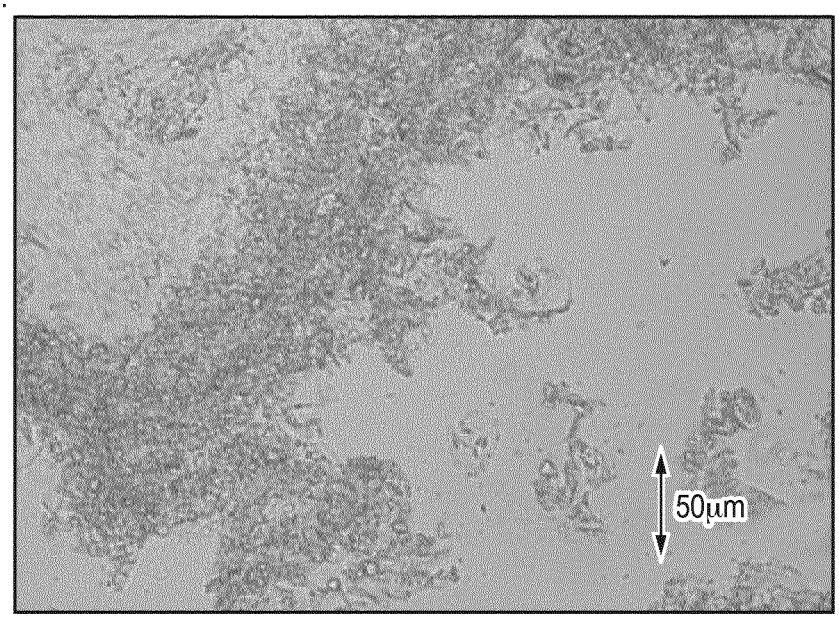

Hazelnut powder (particle size distribution given in FIG. 6A) was mixed in palm kernel oil at 55° C. using an Ystral Conti TDS mixer for 30 min with continuous recirculation and milled on colloid mill Fryma MZ-80, equipped with a Polytron Mitec mixer and F-X50 disperser in the funnel to help dispersion. Several passes with gap fully opened (3 mm) are applied to obtain a fine ground almond particles dispersed in oil. The obtainable particle size distribution is given in FIG. 6B.

The fine hazelnut dispersion is then micronized in a second milling step using a wet bead mill (Hosokawa Alpine Hydro-Mill 90 AHM, T=65° C., zirconium oxide bead 1.7/1.9 mm, 3000 RPM, TS33).

After one passage through the mill the size distribution of the micronized particles is characterized by a $d_{90,3}$ of 32 μm, i.e 90% of the mass belongs to particles with a diameter smaller than 32 micrometers. The particle size distribution of hazelnuts micronized in oil as described above is given in FIG. 6 C.

The oil containing micronized hazelnut particles was then mixed with monoglyceride Dimodan™ and Panodan™ (Dupont). In parallel typical non-dairy creamer ingredients (sodium caseinate, dipotassium phosphate, sodium hexametaphosphate, trisodium citrate, and sodium chloride) were mixed in water and stirred in a vessel at 50° C.

These two mixes were then mixed and stirred at 50° C. with the addition of glucose syrup. The final mix was homogenized (APV-HTST) and pasteurized (APV-HTST at 85° C. during 5 sec). The pasteurized mix was then spray-dried (NIRO SD-6.3-N) at 160° C. In this example, 5% of the final creamer dry weight is represented by hazelnut particles added via the oil phase.

Sedimentation Results

Figure 7:
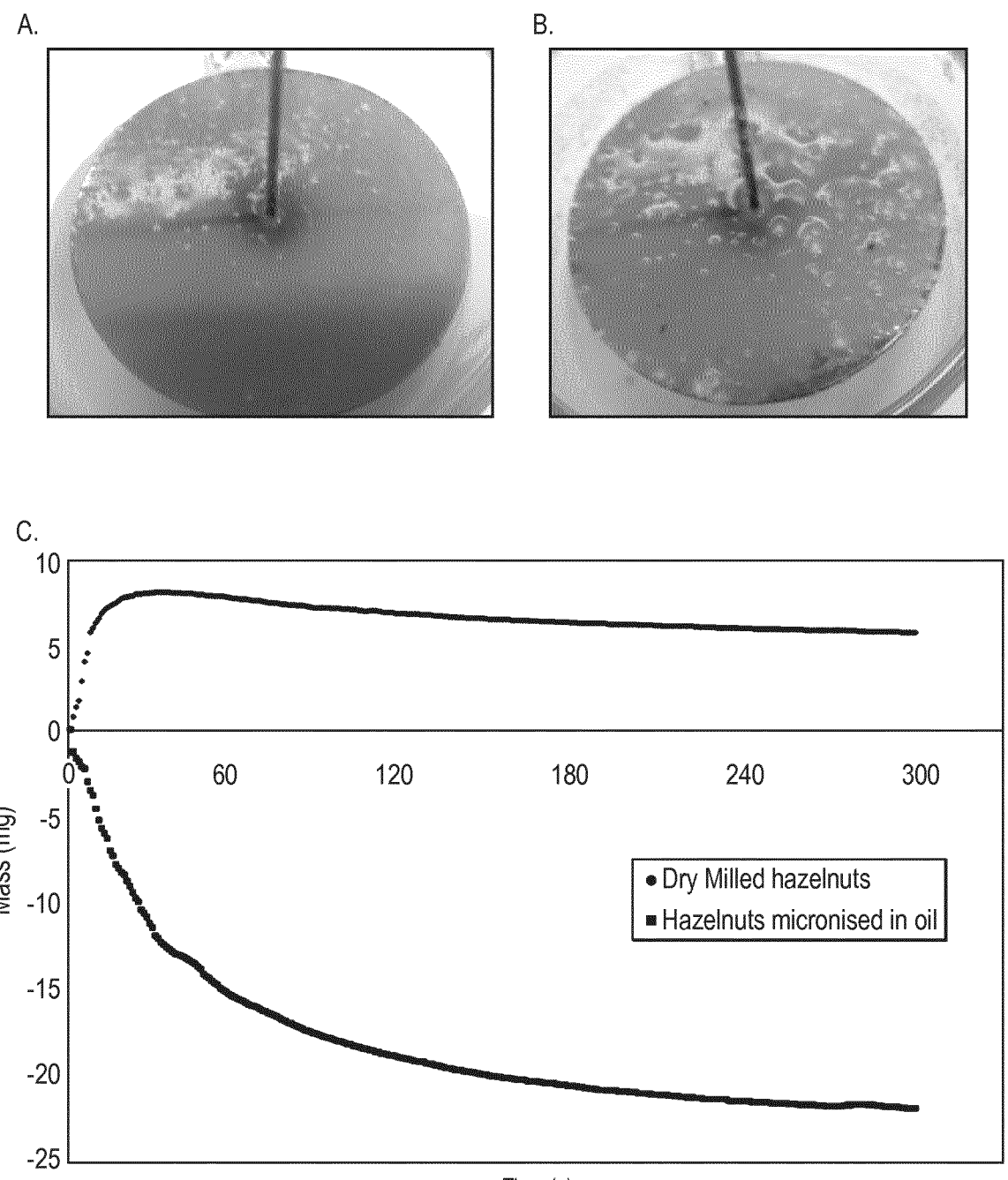
FIG. 7 shows sedimentation analysis results from beverage samples containing hazelnuts.

Measurement of mass of sediments in the cup on submersed plate is shown on FIG. 7 A for a reconstituted creamer according to the current invention and in FIG. 7 B for a reference creamer preparation with dry-milled hazelnut particles mixed into the preparation. Based on continuous and quantitative measurement of particle sedimentation in the cup with the help of the sedimentation balance, the stability of the dispersion of the micronized particles in the creamer preparation can be evaluated. The result is presented in FIG. 7C. While an increase of the sedimented hazelnut particle mass for the reference sample (dry milled hazelnut particles mixed into creamer preparation) is observed, the product according to the current invention (i.e. hazelnut micronized in oil) does not settle within 5 min time. The mass on the sedimentation balance even decreases slightly, as some light particles move upwards, driven by buoyancy as illustrated in FIG. 1. Very few sediments are found on the immersed plate for the micronized hazelnut in oil sample.

Microscopy Results

Figure 8:
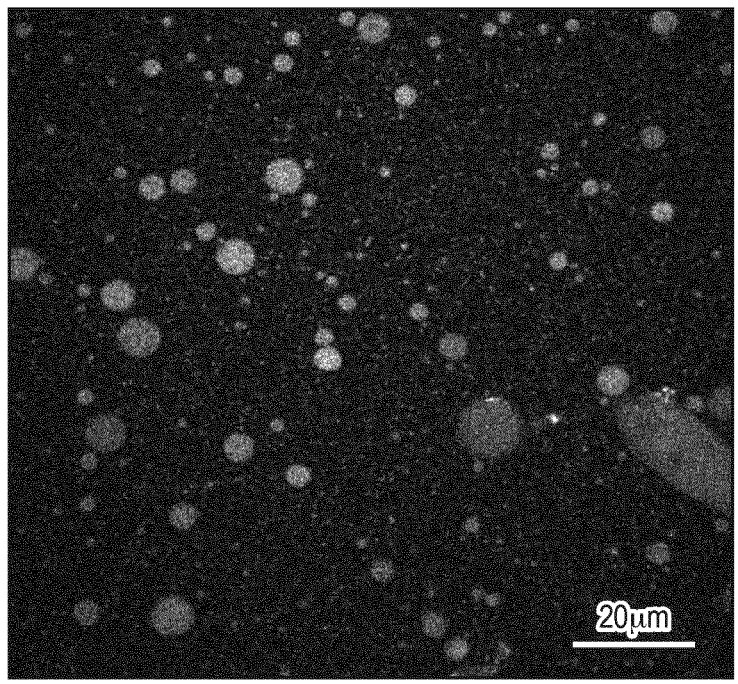
FIG. 8: Confocal microscope images showing the interface of oil droplets (red) emulsified in water. 8A: Reconstituted reference beverage with dry milled hazelnuts. No adsorption of stabilizing particles at the interphase can be found. 8B: Beverage containing hazelnuts micronized in oil. White arrows point at protein-rich particles adsorbed at the oil-water interphase that stabilize the emulsion. Such particles cannot be found in the reference beverage.
Figure 8:
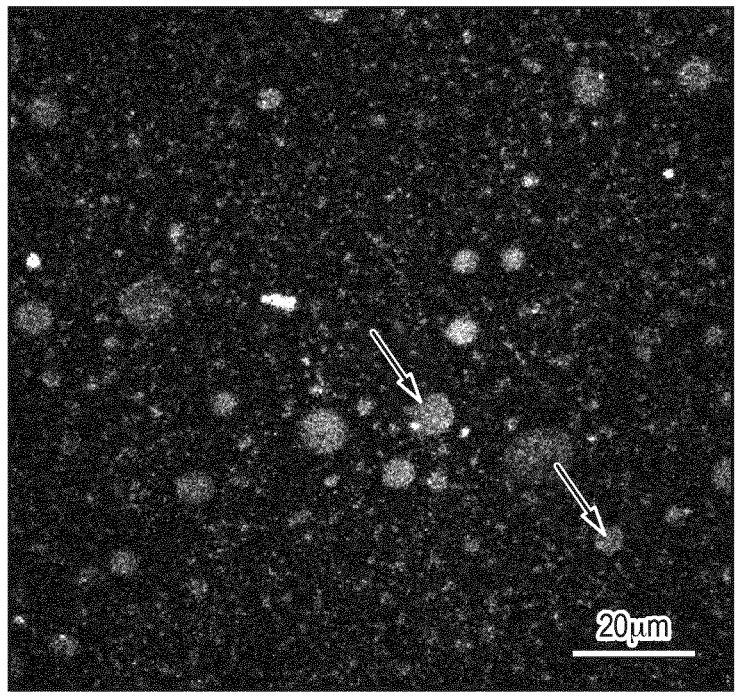

The confocal microscopy pictures presented on FIG. 8B show an intense signal next to the oil droplets surface when the particles have been milled in oil whereas no specific signal is observed in the case of the reference sample (FIG. 8A). The presence of the particles next to the oil/water interface contributes to a better stabilization of the beverages making the entity "in-oil micronized hazelnut particle attached to oil droplet" heavier (i.e. increase in density) than the single oil droplet and lighter than the particle itself (per unit volume). In these conditions, oil covered micronized hazelnut particle sedimentation is prevented due to density match. In addition, no visual flocculation of particles is observed.

The problem faced by current known prior art methods can be understood from the confocal microscopic image shown in FIG. 8A.

Example 4

Process for Providing a Beverage Powder
Methods

Coconut powder (particle size distribution given in FIG. 2A) was milled in a pregrinding step in a colloid mill (Fryma MZ-80). Coconut powder (at room temperature) is mixed into palm kernel oil at T=55° C. for 20 min until coconut chips are fully dispersed.

The mix is then milled in 5 passes, gradually reducing the outlet gap size to the minimum. The obtainable particle size distribution is given in FIG. 2B and illustrated in a microscopic image (see FIG. 2 C).

This fine coconut dispersion is then micronized in a second milling step using a wet bead mill (Hosokawa Alpine Hydro-Mill 90 AHM, T=65° C., zirconium oxide bead 1.7/1.9 mm, 3000 RPM, TS33).

After two passages through the mill the size distribution of the micronized particles is characterized by a $d_{90,3}$ of 77 μm, i.e 90% of the mass belongs to particles with a diameter smaller than 77 micrometers. The corresponding particle size distribution is given in FIG. 2D and illustrated by a microscopic image in FIG. 2E.

The oil containing micronized coconut particles was then mixed with monoglyceride Dimodan™ and Panodan™ (Dupont). In parallel typical non-dairy creamer ingredients (sodium caseinate, dipotassium phosphate, sodium hexametaphosphate, trisodium citrate, and sodium chloride) were mixed in water and stirred in a vessel at 50° C.

These two mixes were then mixed and stirred at 50° C. with the addition of glucose syrup. The final mix was homogenized (APV-HTST) and pasteurized (APV-HTST at 85° C. during 5 sec). The pasteurized mix was then spray-dried (NIRO SD-6.3-N) at 160° C.

In this example, 5% of the final creamer dry weight is represented by coconut particles added via the oil phase.

The obtained creamer powder is used as an ingredient in a powdered beverage preparation. For this purpose, the creamer powder containing micronized coconuts is dry mixed with sugar and soluble coffee powder. A typical beverage powder composition comprises 40% creamer with micronized coconuts, 10% soluble coffee and 50% sugar. The micronized coconuts represent 5% of the creamer powder mass. The obtained powder is filled in sachets and provides and instant coconut flavored beverage upon reconstitution with hot water. In another use the described powdered beverage preparation is filled into capsules and provides a chocolate beverage upon reconstitution with the help of a beverage system such as Nescafé Dolce Gusto.

Example 5

Process for Providing a Non-Dairy Milk Beverage
Methods

Figure 4:
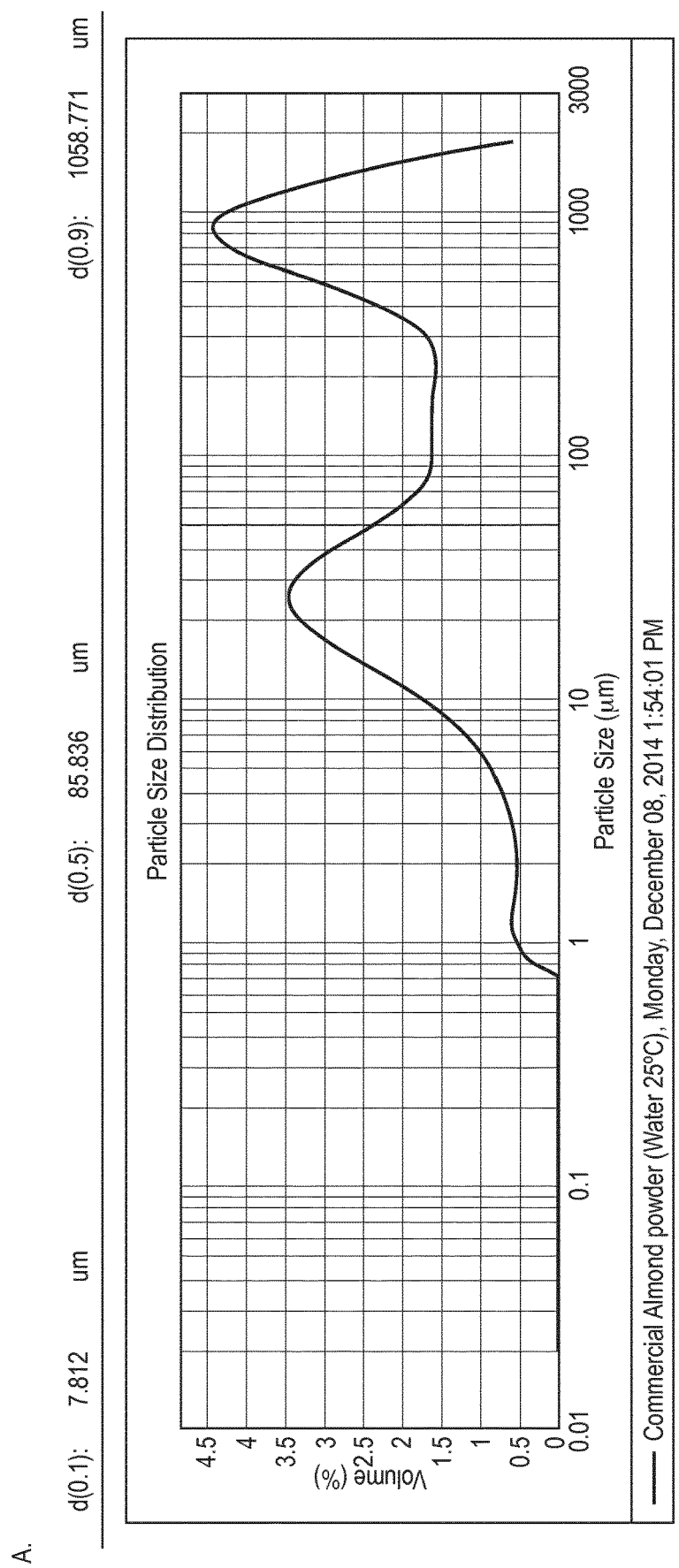
FIG. 4 shows the size distribution of almond particles. 4A: commercial powder. 4B: dispersion of almond powder in oil after pregrinding step. 4C: Almond particles micronized in oil by bead milling.
Figure 4:
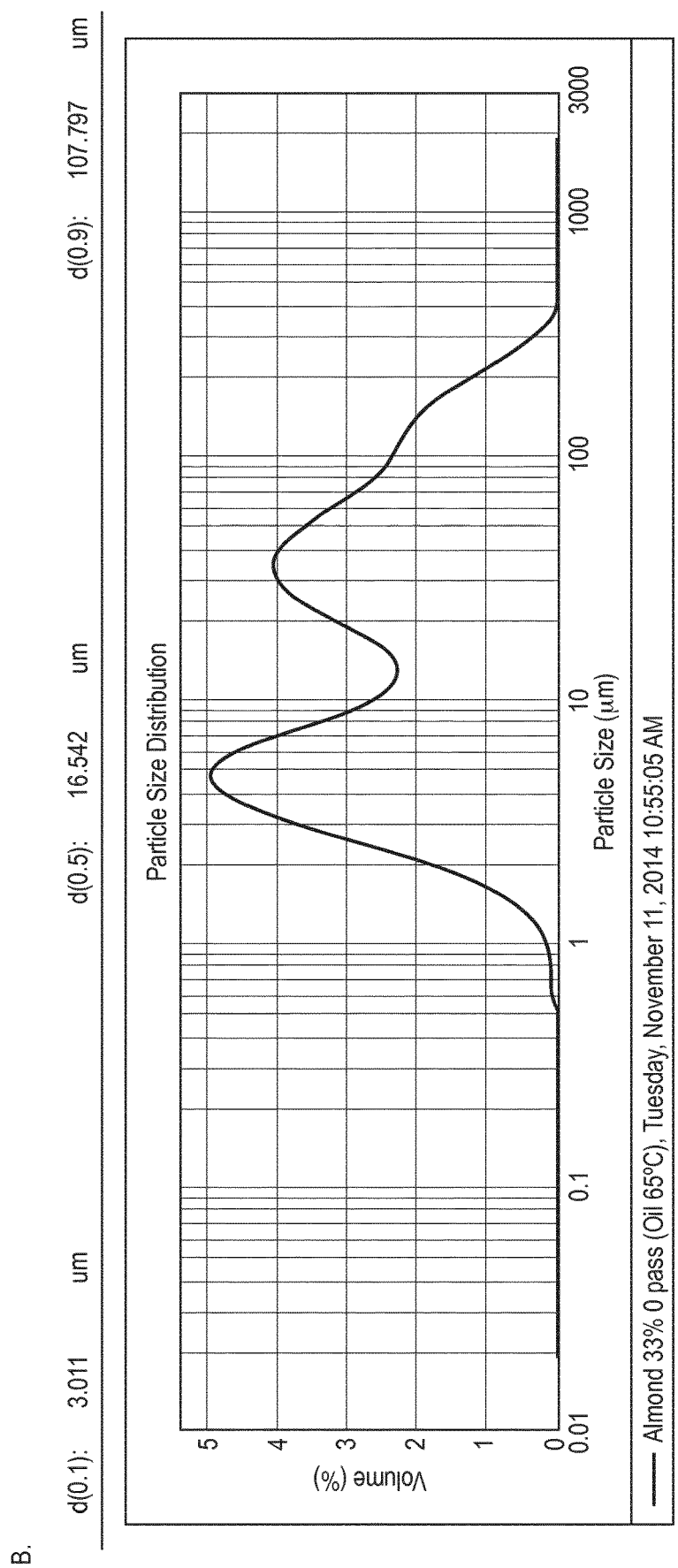
Figure 4:
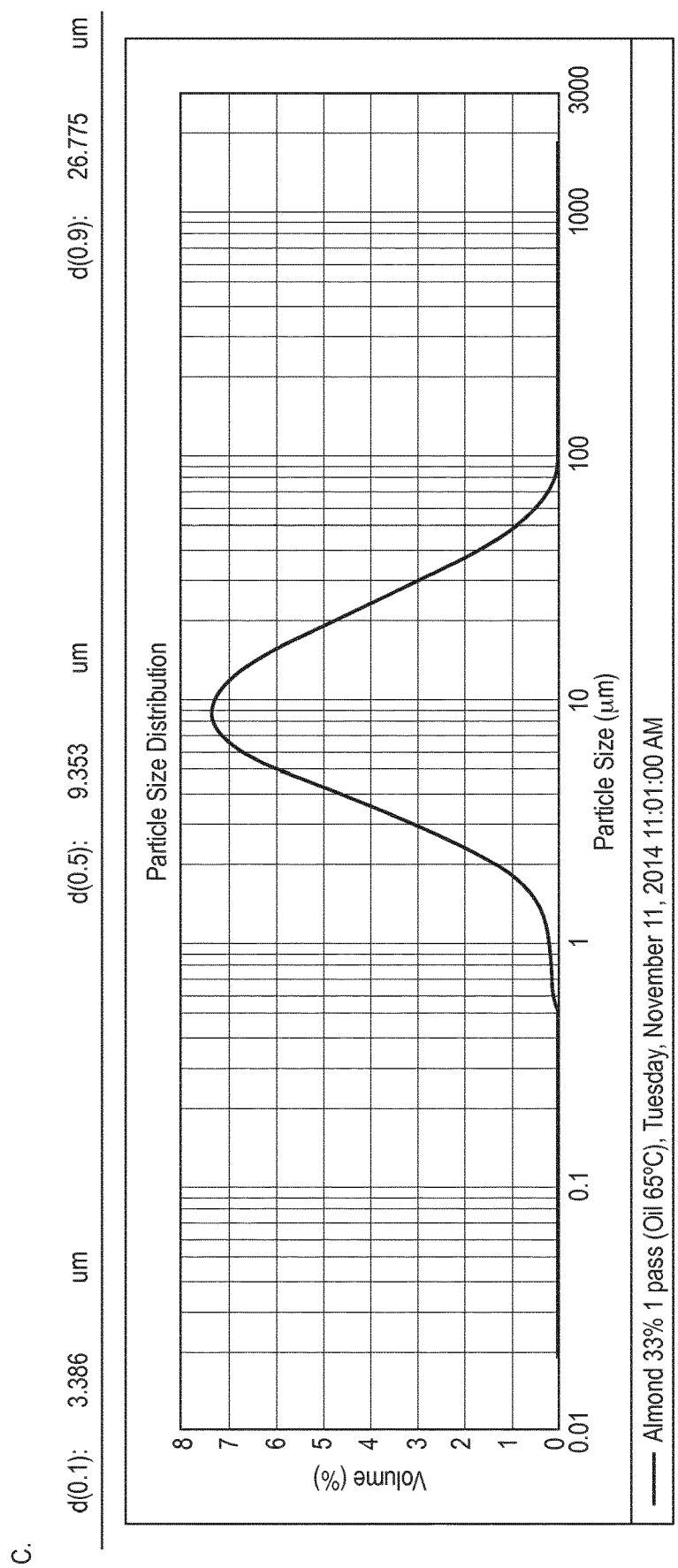

Fine ground almond powder (obtained from pregrinding step as described in example 2, particle size distribution given in FIG. 4B) was mixed with pre-heated palm kernel oil and micronized using a wet bead mill (Hosokawa Alpine Hydro-Mill 90 AHM, T=65° C., zirconium oxide bead 1.7/1.9 mm, 3000 RPM, TS33).

After one passage through the mill the size distribution of the micronized particles is characterized by a $d_{90,3}$ of 27 μm, i.e 90% of the mass belongs to particles with a diameter smaller than 27 micrometers. The corresponding particle size distribution is given in FIG. 4D and illustrated by a microscopic image in FIG. 4E.

In parallel almond powder was soaked in water for 6 hours. The mix of milled almonds and water was poured into a nylon mesh bag and squeezed, in order to separate the liquid from the insoluble residue. The obtained liquid is referred to as almond milk.

Almond milk (95%) and sugar (5%) were mixed and stirred in a vessel at 50° C.

Both the oily and the aqueous preparation were then mixed and stirred at 50° C. The final mix was pre-heated (80° C.), subjected to UHT treatment by direct steam injection (APV-HTST at 145° C. during 5 sec), flash-cooled to 80° C. and homogenized (APV-HTST).

The final liquid beverage contains 92% almond milk, 4% sugar, 2% fat and 2% micronized almond powder.

The invention claimed is:

1. A process for providing a creamer comprising a plant seed based composition, the process comprising:
    a) mixing an oil with a plant seed and grinding the plant seed in the oil to provide a first composition comprising micronized plant seed incorporated in the oil, wherein the oil is selected from the group consisting of a palm kernel oil, a canola oil, a soybean oil, a sunflower oil, a safflower oil, a cotton seed oil, a palm oil, a milk fat, a corn oil, a high oleic oil, a coconut oil, and combinations thereof;
    b) providing a second composition comprising an aqueous solution comprising sodium caseinate, dipotassium phosphate, sodium hexametaphosphate, trisodium citrate, sodium chloride, and water and having a protein content of 0.5-15% (w/w);
    c) mixing the first composition with the second composition to provide a mixed composition; and
    d) homogenizing the mixed composition to provide an oil-in-water emulsion to provide the creamer.

2. The process according to claim 1, further comprising:
    adding a bulking agent and/or a sweetener agent to the oil-in-water emulsion; and
    pasteurizing or commercially sterilizing the oil-in-water emulsion.

3. The process according to claim 2, wherein the bulking agent comprises maltodextrin, and the sweetener agent is selected from the group consisting of sugar, a combination of carbohydrates and fibers, and combinations thereof.

4. The process according to claim 1, further comprising drying the oil-in-water emulsion to provide the plant seed based composition.

5. The process according to claim 1, further comprising:
    High Temperature/Short Time (HTST) or Ultra-High Temperature (UHT) treatment of the oil-in-water emulsion using either a direct or indirect process; and
    filling on a clean fill, ultra clean fill (ESL) or aseptic filler.

6. The process according to claim 1, wherein one or more emulsifiers are added in a step selected from the group consisting of:
    to the first composition in step a);
    to the aqueous component in step b);
    during the mixing in step c);
    during the homogenization in step d); and
    combinations thereof.

7. The process according to claim 1, wherein the mixing in step a) comprises milling to micronize the plant seed.

8. The process according to claim 1, wherein the second composition further comprises an additional component selected from the group consisting of skim milk solids, caseinate, whey protein, and combinations thereof.

9. The process according to claim 1, wherein a weight/weight ratio of the plant seed incorporated in the oil and the oil in the first composition of step a) is in a range of 0.01:1-2:1.

10. The process according to claim 9, wherein the mixed composition obtained in step c) comprises at least 5% (w/w) of the oil comprising the micronized plant seed therein.

11. The process according to claim 9, wherein the mixed composition obtained in step c) comprises:
    5-50% (w/w) of the oil comprising the micronized plant seed incorporated therein, wherein the micronized plant seed constitutes 2.5-70% of the total weight of the oil comprising the micronized plant seed incorporated therein;
    1-50% (w/w) of one or more protein components; and
    5-70% (w/w) of a sugar source.

12. A creamer obtainable according to the process of claim 1.

13. The process according to claim 1, wherein the high oleic oil is selected from the group consisting of a high oleic soybean oil, a high oleic canola oil, a high oleic safflower oil, a high oleic sunflower oil, and combinations thereof.

14. The method according to claim 1 further comprising drying the creamer to produce a powder creamer.

15. The method according to claim 1, wherein the creamer is a liquid creamer.

* * * * *